US007966617B2

(12) United States Patent
Hayes, Jr.

(10) Patent No.: US 7,966,617 B2
(45) Date of Patent: **\*Jun. 21, 2011**

(54) TUNABLE ENGINE AND PROGRAM PRODUCT FOR RESOLVING PREREQUISITES FOR CLIENT DEVICES IN AN OPEN SERVICE GATEWAY INITIATIVE (OSGI) FRAMEWORK

(75) Inventor: Kent F. Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/245,278

(22) Filed: Oct. 3, 2008

(65) Prior Publication Data

US 2009/0030979 A1   Jan. 29, 2009

Related U.S. Application Data

(63) Continuation of application No. 10/805,739, filed on Mar. 22, 2004, now Pat. No. 7,478,396.

(51) Int. Cl.
*G06F 9/44* (2006.01)
*G06F 15/173* (2006.01)

(52) U.S. Cl. .......................... 719/311; 719/327; 709/226

(58) Field of Classification Search .................. 719/310, 719/311, 327; 709/223, 224, 225, 226
See application file for complete search history.

(56) References Cited

U.S. PATENT DOCUMENTS

| | | | |
|---|---|---|---|
| 4,751,635 A | 6/1988 | Kret | |
| 6,106,569 A | 8/2000 | Bohrer et al. | |
| 6,237,143 B1 | 5/2001 | Fontana et al. | |
| 6,389,464 B1 | 5/2002 | Krishnamurthy et al. | |
| 6,421,705 B1 | 7/2002 | Northrup | |
| 6,493,871 B1 | 12/2002 | McGuire et al. | |
| 6,553,563 B2 | 4/2003 | Ambrose et al. | |
| 6,587,829 B1 | 5/2003 | Ter Horst et al. | |
| 6,697,849 B1 | 2/2004 | Carlson | |
| 6,748,396 B2 * | 6/2004 | Klicnik et al. | 1/1 |
| 6,871,193 B1 * | 3/2005 | Campbell et al. | 705/67 |

(Continued)

FOREIGN PATENT DOCUMENTS

JP   2002353699 A   * 12/2002

(Continued)

OTHER PUBLICATIONS

Hayes, U.S. Appl. No. 10/805,736, filed Mar. 22, 2004, Notice of Allowance and Fee(s) Due, Sep. 4, 2008, 17 pages.

(Continued)

*Primary Examiner* — Van H Nguyen
(74) *Attorney, Agent, or Firm* — Marcia L. Doubet

(57) ABSTRACT

Under the present invention, each client device will have a corresponding configuration that is accessible to the server. Each configuration sets forth various computer resources as well as corresponding normalization and importance factors for the associated client device. If a certain OSGi bundle is to be loaded and run on a particular client device, certain prerequisites (e.g., services packages, etc.) will likely be necessary. Any prerequisites that the client device lacks will be obtained using potential combinations of other OSGi bundles registered with the server. The most appropriate combination of OSGi bundles will be selected from the possible combinations by processing the configuration based on the amounts of computer resources of the client device that will be consumed by each of the possible combinations.

22 Claims, 3 Drawing Sheets

U.S. PATENT DOCUMENTS

| | | | |
|---|---|---|---|
| 6,920,615 B1* | 7/2005 | Campbell et al. | 715/742 |
| 6,925,471 B2 | 8/2005 | Bodin et al. | |
| 7,191,232 B2 | 3/2007 | Rigori et al. | |
| 7,207,041 B2 | 4/2007 | Elson et al. | |
| 7,231,424 B2 | 6/2007 | Bodin et al. | |
| 7,478,396 B2 | 1/2009 | Hayes, Jr. | |
| 7,523,155 B2* | 4/2009 | Hayes, Jr. | 709/200 |
| 7,640,290 B2 | 12/2009 | Hayes, Jr. | |
| 7,716,663 B2* | 5/2010 | Hayes, Jr. | 717/174 |
| 2002/0013939 A1 | 1/2002 | Daynes et al. | |
| 2002/0184226 A1 | 12/2002 | Klicnik et al. | |
| 2003/0014521 A1 | 1/2003 | Elson et al. | |
| 2003/0023661 A1 | 1/2003 | Clohessy et al. | |
| 2003/0028869 A1 | 2/2003 | Drake et al. | |
| 2003/0038172 A1 | 2/2003 | Bodin et al. | |
| 2003/0046681 A1 | 3/2003 | Barturen et al. | |
| 2003/0050718 A1* | 3/2003 | Tracy et al. | |
| 2003/0097422 A1 | 5/2003 | Richards et al. | |
| 2003/0105854 A1 | 6/2003 | Thorsteinsson et al. | |
| 2003/0131226 A1 | 7/2003 | Spencer et al. | |
| 2003/0145053 A1 | 7/2003 | Bodin et al. | |
| 2003/0191823 A1 | 10/2003 | Bansal et al. | |
| 2004/0117462 A1 | 6/2004 | Bodin et al. | |
| 2004/0117465 A1 | 6/2004 | Bodin et al. | |
| 2004/0117494 A1 | 6/2004 | Mitchell et al. | |
| 2004/0133538 A1 | 7/2004 | Amiri et al. | |
| 2004/0139177 A1* | 7/2004 | Yook | |
| 2004/0260774 A1* | 12/2004 | Jensen et al. | |
| 2004/0267950 A1 | 12/2004 | Praefcke et al. | |
| 2005/0004974 A1 | 1/2005 | Sharma et al. | |
| 2005/0022182 A1* | 1/2005 | Mittal | |
| 2005/0182697 A1* | 8/2005 | Rao | |
| 2005/0188315 A1 | 8/2005 | Campbell et al. | |
| 2005/0193119 A1 | 9/2005 | Hayes, Jr. | |
| 2005/0193388 A1 | 9/2005 | Hayes, Jr. | |
| 2005/0210474 A1 | 9/2005 | Hayes, Jr. | |
| 2005/0223101 A1 | 10/2005 | Hayes, Jr. | |
| 2005/0228847 A1 | 10/2005 | Hayes, Jr. | |
| 2006/0212558 A1* | 9/2006 | Sahinoja et al. | |
| 2009/0030965 A1 | 1/2009 | Hayes, Jr. | |

FOREIGN PATENT DOCUMENTS

WO     WO 00/78005 A2 * 12/2000

OTHER PUBLICATIONS

Hayes, U.S. Appl. No. 10/805,736, filed Mar. 22, 2004, Office Action Summary, Mar. 7, 2008, 16 pages.
Hayes, U.S. Appl. No. 10/805,736, filed Mar. 22, 2004, Office Action Summary, Sep. 10, 2007, 17 pages.
INSPEC, AN 7516673, Richards et al., "Assisting Decision Making in Requirements Reconciliation", 7th International Conference on Computer Supported Cooperative Work in Design, 2002, pp. 345-350.
INSPEC, AN 4341352, Pfannstiel et al., "Self-tuning and Adaptive Control with Personal Computers", Identification and System Parameter Estimation 1991, Selected Papers from the Ninth IFAC/IFORS Symposium, pp. 1215-1220, vol. 2, 1992.
Gallivan et al., "Strategies for Implementing New Software Processes: An Evaluation of a Contingency Framework", SIGCPR/SIGMIS 1996, pp. 313-325.
Liang et al., "Bundle Dependency in Open Services Gateway Initiative Framework Initialization", Feb. 2002, IEEE, pp. 122-126.
Kawamura et al., "Standardization Activity of OSGi (Open Services Gateway Initiative)", Jan. 2004, NTT Technical Review, pp. 94-97.
Marples et al., "The Open Services Gateway Initiative: An Introductory Overview", Dec. 2001, IEEE, pp. 110-114.
Sugumaran, et al., "Identifying Software Components from Process Requirements Using Domain Model and Object Libraries", Dec. 1999, ICIS '99, Proceedings of the 20th International Conference on Information Systems, pp. 65-81.
Kent F. Hayes, Jr., U.S. Appl. No. 10/787,521, filed: Feb. 26, 2004, Office Action, May 17, 2007, 22 pages.
Kent F. Hayes, Jr., U.S. Appl. No. 10/787,521, filed: Feb. 26, 2004, Office Action, Aug. 14, 2008, 20 pages.
Kent F. Hayes, Jr., U.S. Appl. No. 10/787,521, filed: Feb. 26, 2004, Office Action, Nov. 24, 2008, 21 pages.
Kent F. Hayes, Jr., U.S. Appl. No. 10/787,521, filed: Feb. 26, 2004, Office Action, Jun. 24, 2009, 23 pages.
Kent F. Hayes, Jr., U.S. Appl. No. 10/787,521, filed: Feb. 26, 2004, Examiner's Interview Summmary, Mar. 8, 2010, 3 pages.
Kent F. Hayes, Jr., U.S. Appl. No. 10/787,521, filed: Feb. 26, 2004, Notice of Allowance, Dec. 29, 2009, 9 pages.
Kent F. Hayes, Jr., U.S. Appl. No. 10/787,520, filed: Feb. 26, 2004, Office Action, Dec. 12, 2007, 22 pages.
Kent F. Hayes, Jr., U.S. Appl. No. 10/787,520, filed: Feb. 26, 2004, Examiner's Interview Summary, Mar. 28, 2008, 4 pages.
Kent F. Hayes, Jr., U.S. Appl. No. 10/787,520, filed: Feb. 26, 2004, Office Action, May 23, 2008, 15 pages.
Kent F. Hayes, Jr., U.S. Appl. No. 10/787,520, filed: Feb. 26, 2004, Pre-Appeal Brief Conference Decision, Oct. 10, 2008, 2 pages.
Kent F. Hayes, Jr., U.S. Appl. No. 10/787,520, filed: Feb. 26, 2004, Office Action, Jun. 25, 2009, 20 pages.
Kent F. Hayes, Jr., U.S. Appl. No. 10/787,520, filed: Feb. 26, 2004, Office Action, Jan. 21, 2010, 22 pages.
Kent F. Hayes, Jr., U.S. Appl. No. 10/787,520, filed: Feb. 26, 2004, Office Action, Jun. 30, 2010, 22 pages.
Kent F. Hayes, Jr., U.S. Appl. No. 10/787,520, filed: Feb. 26, 2004, Office Action Dec. 6, 2010, 23 pages.
Kent F. Hayes, Jr., U.S. Appl. No. 10/805,739, filed: Mar. 22, 2004, Examiner's Interview Summary, Dec. 12, 2007, 3 pages.
Kent F. Hayes, Jr., U.S. Appl. No. 10/803,236, filed: Mar. 18, 2004, Office Action, Oct. 18, 2007, 14 pages.
Kent F. Hayes, Jr., U.S. Appl. No. 10/803,236, filed: Mar. 18, 2004, Office Action, Apr. 2, 2008, 17 pages.
Kent F. Hayes, Jr., U.S. Appl. No. 10/803,236, filed: Mar. 18, 2004, Notice of Allowance, Aug. 21, 2008, 4 pages.
Kent F. Hayes, Jr., U.S. Appl. No. 12/243,997, filed: Oct. 2, 2008, Office Action, Mar. 23, 2009, 5 pages.
Kent F. Hayes, Jr., U.S. Appl. No. 12/243,997, filed: Oct. 2, 2008, Notice of Allowance, Aug. 11, 2009, 4 pages.
Kent F. Hayes, Jr., U.S. Appl. No. 10/805,963, filed: Mar. 22, 2004, Office Action, Apr. 17, 2007, 24 pages.
Kent F. Hayes, Jr., U.S. Appl. No. 10/805,963, filed: Mar. 22, 2004, Office Action, Oct. 5, 2007, 32 pages.
Kent F. Hayes, Jr., U.S. Appl. No. 10/805,963, filed: Mar. 22, 2004, Office Action, Apr. 7, 2008, 31 pages.
Kent F. Hayes, Jr., U.S. Appl. No. 10/805,963, filed: Mar. 22, 2004, Office Action, Sep. 19, 2008, 34 pages.
Kent F. Hayes, Jr., U.S. Appl. No. 10/805,963, filed: Mar. 22, 2004, Pre-Appeal Brief Conference Decision, Jan. 23, 2009, 3 pages.
Kent F. Hayes, Jr., U.S. Appl. No. 10/805,963, filed: Mar. 22, 2004, Office Action, Feb. 11, 2009, 20 pages.
Kent F. Hayes, Jr., U.S. Appl. No. 10/805,963, filed: Mar. 22, 2004, Office Action, Aug. 3, 2009, 26 pages.
Kent F. Hayes, Jr., U.S. Appl. No. 10/805,963, filed: Mar. 22, 2004, Notice of Abandonment, Feb. 16, 2010, 2 pages.
Hall, et al., "Component Deployment on OSGi: The Gravity Case", Jan. 29, 2003, Fractal Workshop, Slides 1-53.
Lind, et al., "Experiences from Development of Home Health Care Applications based on Emerging Java Technology", MEDINFO 2001, Proceedings of the 10th World Congress on Medical Informatics, London, UK, Sep. 2-5, 2001, 5 pages.
Hanson, et al. "A flexible and recoverable client/server database event notification system", The VLDB Journal (1998), pp. 12-24.
Weiss, et al., "Goal-Oriented Software Assessment", ICSE '02, May 19-25, 2002, pp. 221-231.
McClenaghan, et al., "Manchester University Tiny Network Element Monitor (MUTiny NEM): A Network/Systems Management Tool", TERENA Networking Conference 2000, 7 pages.
Grotjohn, et al., "An Intergrated Method for Installing Non-Integrated Software", IBM Research Disclosure, vol. 41, No. 408, Apr. 1998, 4 pages.
Condry, et al., "Open Service Gateway Architecture Overview", Conference Proceedings, IEEE, 1999. Abstract only, 1 page.
Valtchev, et al., "Service Gateway Architecture for a Smart Home", IEEE Communications Magazine, vol. 40, No. 4, Apr. 2002, pp. 126-132. Abstract only, 1 page.

Kim, et al., "Context-aware Application Framework Based on Open Service Gateway", 2001 International Conference on Info-Tech and Info-Net Proceedings, vol. 3, IEEE, pp. 209-213. Abstract only, 1 page.

Kim, et al., "Context-aware Application Framework Based on Open Service Gateway", 2001 International Conference on Info-Tech and Info-Net Proceedings, vol. 5, IEEE, pp. 200-204. Abstract only, 2 pages.

Topalis, et al., "A Novel Architecture for Remote Home Automation E-Services on an OSGi Platform Via High-Speed Internet Connection Ensuring QoS Support by Using RSVP Technology", IEEE Transactions on Consumer Electronics, vol. 48, No. 4, Nov. 2002, pp. 825-833. Abstract only, 1 page.

Antognini, et al., "New Software Tools for Design and Implementation of Complete High Performance Motion Systems", 1994. Abstract only, 1 page.

Cabezas, et al., "Personal Systems Functional Architectural Verification Methodology", Technical Disclosure Bulletin, vol. 34, No. 10b, Mar. 1992, pp. 141-145. Abstract only, 4 pages.

Hauser, et al., "Anonymous Delivery of Goods in Electronic Commerce", Technical Disclosure Bulletin, vol. 39, No. 3, Mar. 1996, pp. 363-366. Abstract only, 1 page.

Zwart, Steve, "Bloodhound Server Monitor Package", Research Disclosure No. 435, Article 152, Jul. 2000, p. 1289. 7 pages.

Mamada, R., "A Software Managing Clustered Multi Vendor Uninterruptible Power Supply on Network", Research Disclosure Bulletin No. 419, vol. 42, Mar. 1999, Article 419103. 2 pages.

Van Arsdall, et al., "National Ignition Facility Intergrated Computer Control System", Proceedings of the SPIE, The International Society for Optical Engineering, vol. 3492, 1999, pp. 538-548. Abstract only, 2 pages.

Magee, et al., "Encapsulated Platform Independent Installation Object", IBM Technical Disclosure Bulletin/Research Disclosure, Research Disclosure No. 451, Article 148, Nov. 2001, p. 1959. Abstarct only, 2 pages.

Hoffman, "CALLOS2W", Technical Disclosure Bulletin, vol. 39, No. 4, Apr. 1996, pp. 91-96.

Magee, et al., "Encapsulated Platform Independent Installation Object", IBM Technical Disclosure Bulletin/Research Disclosure, Research Disclosure No. 451. Article 148, Nov. 2001, p. 1959.

Condry, et al., "Open Service Gateway Architecture Overview", Conference Proceedings, IEEE, 1999.

Valtchev, et al., "Service Gateway Architecture for a Smart Home", IEEE Communications Magazine, vol. 40, No. 4, Apr. 2002, pp. 126-132.

Kim, et al., "Context-aware Application Framework Based on Open Service Gateway", 2001 International Conference on Info-Tech and Info-Net Proceedings, vol. 3, IEEE, pp. 209-213.

Kim, et al., "Context-aware Application Framework Based on Open Service Gateway", 2001 International Conference on Info-Tech and Info-Net Proceedings, vol. 5, IEEE, pp. 200-204.

Topalis, et al., "A Novel Architecture for Remote Home Automation E-Services on an OSGi Platform Via High-Speed Internet Connection Ensuring QoS Support by Using RSVP Technology", IEEE Transactions on Consumer Electronics, vol. 48, No. 4, Nov. 2002, pp. 825-833.

Hauser, et al., "Anonymous Delivery of Goods in Electronic Commerce", Technical Disclosure Bulletin, vol. 39, No. 3, Mar. 1996, pp. 363-366.

Cabezas, et al., "Personal Systems Functional Architectural Verification Methodology", Technical Disclosure Bulletin, vol. 34, No. 10b, Mar. 1992, pp. 141-145.

* cited by examiner

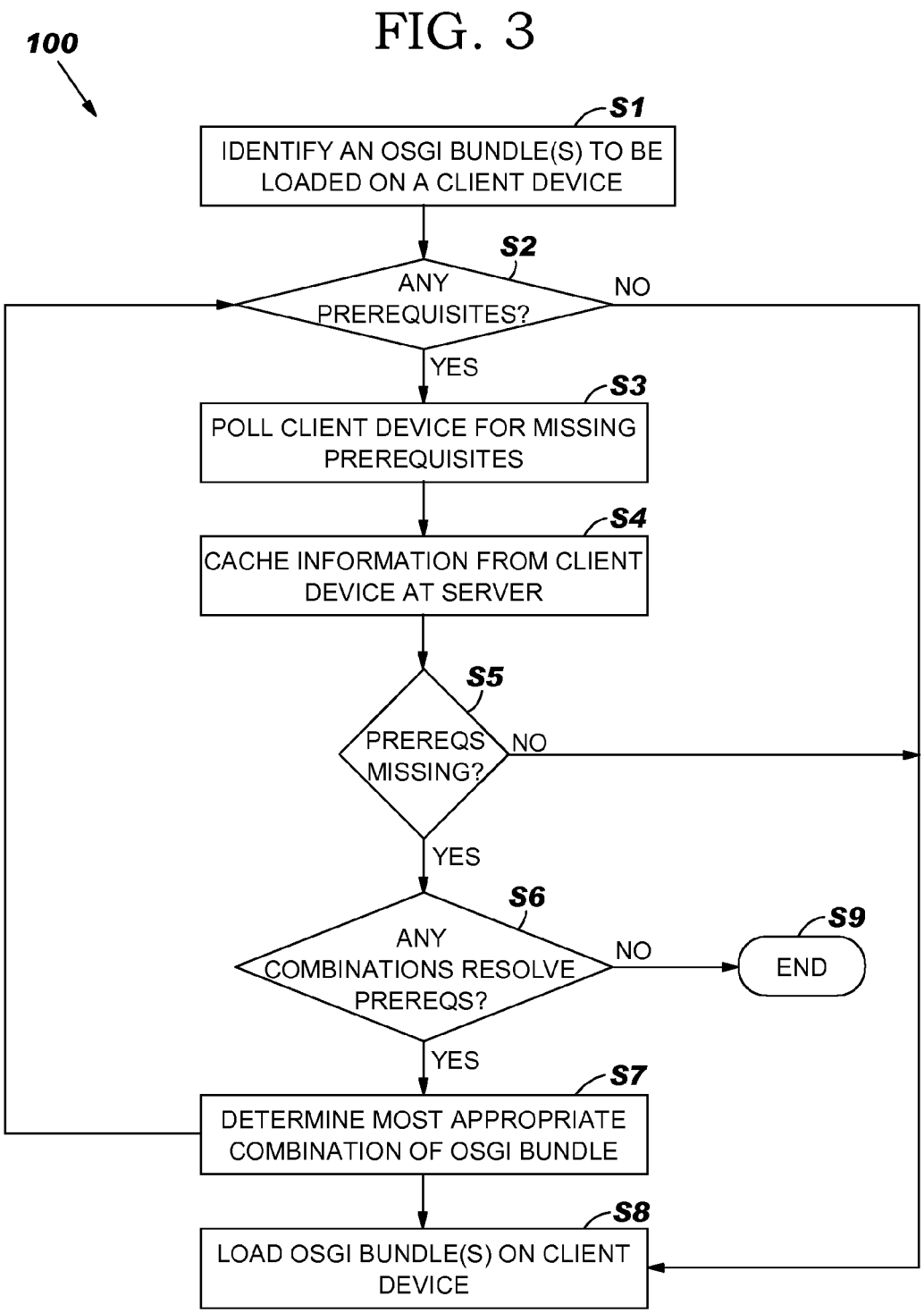

TUNABLE ENGINE AND PROGRAM PRODUCT FOR RESOLVING PREREQUISITES FOR CLIENT DEVICES IN AN OPEN SERVICE GATEWAY INITIATIVE (OSGI) FRAMEWORK

REFERENCE TO PRIOR APPLICATIONS

This application is a continuation application of U.S. patent application Ser. No. 10/805,739, filed on Mar. 22, 2004 (now U.S. Pat. No. 7,478,396), which is hereby incorporated by reference.

BACKGROUND OF THE INVENTION

1. Field of the Invention

In general, the present invention relates to a tunable engine, method and program product for resolving prerequisites for client devices utilizing an OSGi runtime/framework. Specifically, the present invention allows the prerequisite resolution process to be uniquely configurable for different client devices.

2. Related Art

As computer networking has become more advanced, a standard known as the Open Service Gateway Initiative (OSGi) has been developed. The OSGi is an industry plan to provide a standard way to deliver managed services to devices and local networks. With such a standard, home users could, for example, change the setting on their thermostat from a remote location (e.g., the workplace). In general, the OSGi provides a good framework for developing application components. Under the OSGi, a basic component is known as an OSGi bundle. An OSGi application can be made up of combinations/suites of bundles that might share common functionality. To this extent, the OSGi allows developers to define the dependencies between the bundles such as the packages and services required by the bundles. In a typical implementation, an OSGi architecture will include, among other components, a server and one or more client devices. Each client device will have an OSGi environment within which OSGi applications are deployed. Using a management program on the sever, the functions of the OSGi applications can be controlled.

Unfortunately, as convenient as the OSGi framework can be, it currently fails to provide a tunable way to resolve prerequisites for OSGi bundles that are to be loaded and run on a client device. For example, for an OSGi bundle to properly run on a client device, certain packages and/or services might be necessary and levels of resources such as RAM, sockets, threads, disk space, etc. If the client device is lacking any of the necessary prerequisites, other OSGi bundles (or combinations thereof) that provide the missing prerequisites should be utilized.

However, it may be the case that there is more than one combination of OSGi bundles that could provide the missing prerequisites. These different combinations of bundles might consume different levels of resources (i.e., RAM, sockets, threads, disk space, etc.). The collection of bundles chosen to supply the missing prerequisites should make the best use of the resources available without exceeding the resource levels available on the device. Some resources available on the device might be relatively more sparse and/or valuable then other resources on the device. Thus, there exists a need not only to resolve and supply the missing prerequisites, but to do so in a manner consistent with the aforementioned characteristics (i.e., level and relative value of a type of resource). As such, the server should reconcile the capabilities of the client device with the necessary prerequisites of the OSGi bundles. This is not a simple goal to realize especially since each different client device could have different capabilities or available computer resources. Moreover, an OSGi bundle identified to address a prerequisite that the client device lacks could itself have certain prerequisites that the client device lacks. Accordingly, not only should the prerequisite resolution process be configurable for each type of client device (or individual client device as appropriate), but it should also be done recursively to ensure that all prerequisites are resolved.

In view of the foregoing, there exists a need for a tunable engine, method and program product for resolving prerequisites for client devices utilizing an Open Service Gateway Initiative (OSGi) framework/runtime. Specifically a need exists for a system that can recursively resolve prerequisites based on the individual needs and resource characteristics of the target client device. To this extent, a further need exists for the system to accommodate any quantity of client devices.

SUMMARY OF THE INVENTION

In general, the present invention provides a tunable engine, method and program product for resolving prerequisites for client devices in an Open Service Gateway Initiative (OSGi) framework. Specifically, under the present invention, each type of client device (or each individual client device) will have a corresponding configuration (e.g., a Java properties file in one possible embodiment of the invention) that is accessible to the server. Each configuration sets forth various types of computer resources of the device(s), as well as corresponding normalization and importance factors for the associated client device (or group of client devices). If certain OSGi bundle(s) is/are to be loaded and run on a particular client device, various prerequisites (e.g., services packages, etc.) will likely be necessary. Any prerequisites that the client device lacks will be obtained using potential combinations of other OSGi bundles registered with the server. Under the present invention, the most appropriate combination of OSGi bundles will be identified to supply the missing prerequisites by processing the configuration and determining, based on the amount of computer resources (of the client device) that will be consumed by each of the possible combinations, an appropriate combination Specifically, the combination of OSGi bundles that best meets the needs of the client device as set forth in the corresponding configuration will be selected.

A first aspect of the present invention provides a tunable prerequisite resolution engine for client devices in an Open Service Gateway Initiative (OSGi) framework, comprising: a prerequisite computation system for determining, on a server, necessary prerequisites for one or more OSGi bundle(s) to be run on a client device; a bundle identification system for identifying possible combinations of OSGi bundles on the server that fulfill any of the necessary prerequisites that are lacking from the client device; a data access system for accessing a configuration corresponding to the client device, wherein the configuration sets forth computer resource types, and corresponding normalization factors and importance factors for the client device (or group of client devices); and a bundle selection system for selecting the best combination of OSGi bundles from the possible combinations of OSGi bundles by processing the configuration and computing based on amounts of the computer resources needed by each of the possible combinations of OSGi bundles.

Another aspect of the present invention provides a program product stored on a recordable medium for automatically resolving prerequisites for client devices in an Open Service Gateway Initiative (OSGi) framework, which when executed, comprises: program code for determining, on a server, necessary prerequisites for an OSGi bundle to be run on a client device; program code for determining possible combinations of OSGi bundles on the server that fulfill any of the necessary prerequisites that are lacking from the client device; program code for accessing a configuration corresponding to the client device, wherein the configuration sets forth computer resource types and corresponding normalization factors and importance factors for the client device; and program code for selecting a final combination of OSGi bundles from the possible combinations of OSGi bundles by processing the configuration based on amounts of the computer resources needed by each of the possible combinations of OSGi bundles.

Therefore, the present invention provides a tunable engine, method and program product for resolving prerequisites for client devices utilizing an Open Service Gateway Initiative (OSGi) framework/runtime.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1:
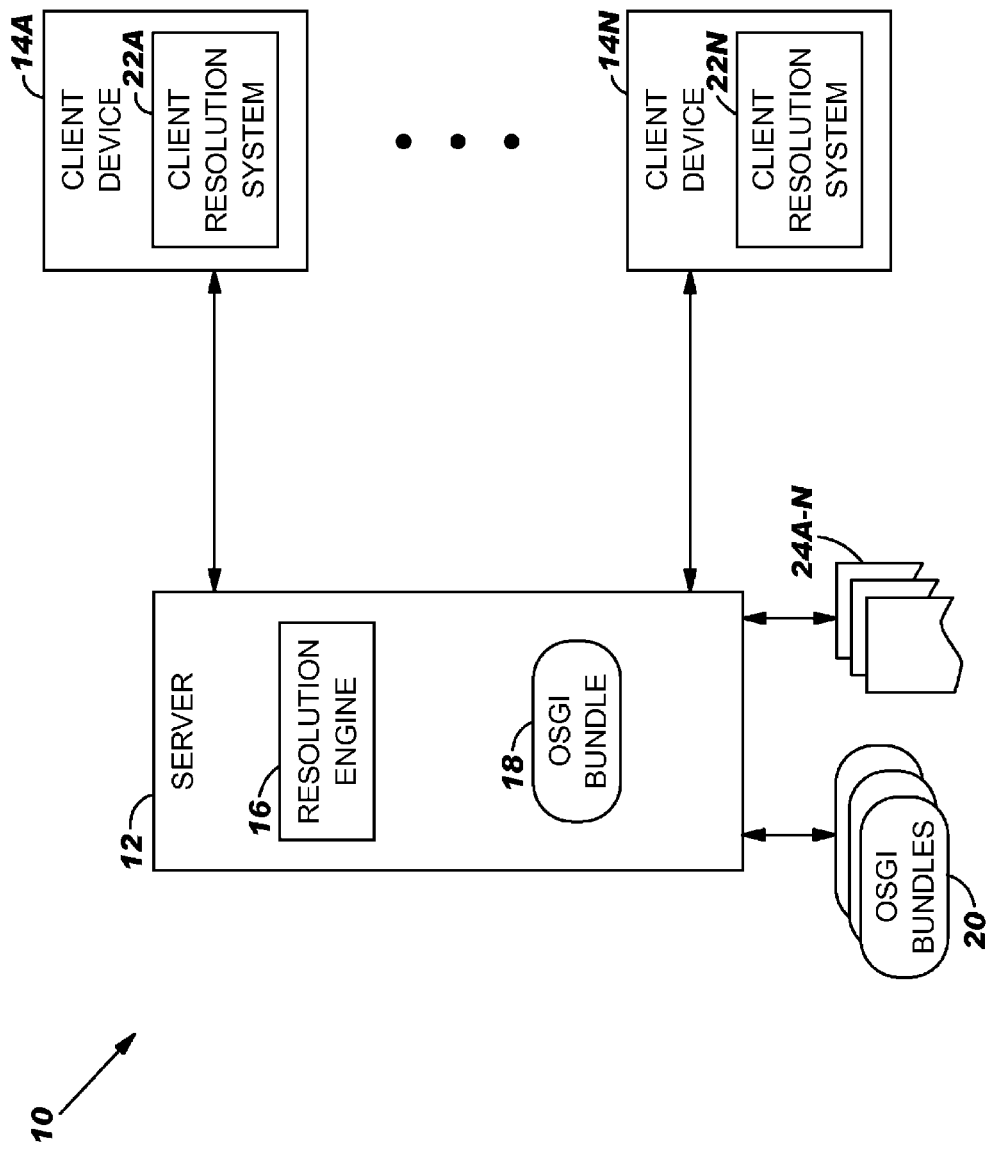
FIG. 1 depicts an illustrative system for resolving prerequisites for client devices utilizing an OSGi framework/runtime according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention will have the following sections:
I. General Description
II. Detailed Example

I. General Description

As indicated above, the present invention provides a tunable engine, method and program product for resolving prerequisites for client devices utilizing an Open Service Gateway Initiative (OSGi) framework/runtime. Specifically, under the present invention, each type of client device (or each individual client device) will have a corresponding configuration (e.g., a Java properties file) that is accessible to the server. Each configuration sets forth various types of computer resources of the device(s), as well as corresponding normalization and importance factors for the associated client device. If certain OSGi bundle(s) is/are to be loaded and run on a particular client device, various prerequisites (e.g., services packages, etc.) will likely be necessary. Any prerequisites that the client device lacks will be obtained using potential combinations of other OSGi bundles registered with the server. Under the present invention, the most appropriate combination of OSGi bundles will be identified to supply the missing prerequisites by processing the configuration and determining, based on the amount of computer resources (of the client device) that will be consumed by each of the possible combinations, an appropriate combination Specifically, the combination of OSGi bundles that best meets the needs of the client device as set forth in the corresponding configuration will be selected.

As used herein, the term "prerequisites" refer to packages, services or the like that are needed by a client device in order to properly run an OSGi bundle. For example, OSGi bundle "X" might require service "A" and package "C" to be properly run. As known, under the OSGi, a "package" is similar to a JAVA package and a "service" is a certain type of interface. In addition, the term "computer resources" is intended to refer to resources of the client device such as memory, RAM, and the like.

Referring now to FIG. 1, an illustrative system 10 for resolving prerequisites for client devices 14A-N in an OSGi framework/runtime according to the present invention is shown. As depicted, system 10 includes server 12 and client devices 14A-N. It should be understood that the architecture shown herein is illustrative only and will likely include other known components not shown. For example, a typical OSGi framework would likely include a device, OSGi agents (on client devices 14A-N), a device management server and one or more application servers. Moreover, it should be understood that a typical OSGi framework could include multiple servers 12 and a network dispatcher. In any event, client devices 14A-N are intended to represent any type of computerized device capable of communicating over a network. For example, client devices 14A-N could be desktop computers (e.g., WIN-32-based, Linux based, etc.), hand held devices, set top boxes, home appliances, security systems, etc. In any event, server 12 and client devices 14A-N typically communicate over any type of network such as the Internet, a local area network (LAN), a wide area network (WAN), a virtual private network (VPN), etc. As such, communication between server 12 and client devices 14A-N could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, client devices 14A-N could utilize an Internet service provider to establish connectivity to server 12.

Under the present invention, each client device 14A-N (or type of client device, or group of client devices) will have a corresponding configuration 24A-N (e.g., a properties file) that is accessible to server 12. Each configuration 24A-N sets forth certain computer resource types of the associated client device as well as corresponding normalization and importance factors. For example, for client device 14A, configuration 24A could resemble the following:

| Computer Resource Type | Normalization | Importance |
|---|---|---|
| BundleStorage | 0.0001 | 0 |
| NewSpaceSize | 0.0001 | 10 |
| OldSpaceSize | 0.0001 | 0 |
| OpenFiles | 10 | 0 |
| Quota | 0.0001 | 0 |
| RAM | 0.0001 | 0 |
| Sockets | 10 | 0 |
| Threads | 10 | 5 |
| Total RAM | 0.0001 | 10 |

The normalization factors allows each of the computer resources to be compared on an equal basis. For example, according to the above factors, 10 sockets is the roughly equivalent of 0.0001 K of RAM. The importance factors allow an importance level to be assigned to each computer resource with respect to the particular client device 14A-N. For example, using the above configuration, it can be seen that conserving NewSpaceSize and Total Ram are the most important factors to client device 14A. Conserving the number of threads used is of lesser importance, while the remaining computer resources (having been assigned an importance factor of 0) have no importance to client device 14A one way or the other. As will be further described below, configurations 24A-N such as the above allows the prerequisite resolution process to be individually tuned for each client device 14A-N. The process can additionally be tuned for each type of client device, arbitrary collections of client devices, etc.

In any event, assume that server 12 is attempting to load OSGi bundle 18 on client device 14A. As known, an OSGi bundle is essentially a .JAR file with certain characteristics/functionality which enable it to effectively interact with and be controlled by the OSGi framework. Server 12 includes (tunable) resolution engine 16, which can incorporate parts of, or be included within any type of OSGi management program now known or later developed. It is known that in order for OSGi bundle 18 to be properly run on client device 14A, certain prerequisites might be needed. Under the present invention, resolution engine 16 will determine and resolve such prerequisites. Typically, the prerequisites for OSGi bundle 18 will first be determined by referencing information in a repository or the like. However, in another embodiment, the prerequisites could be determined by analyzing OSGi bundle 18.

Regardless, once the prerequisites are known, resolution engine 16 can communicate the same to client device 14A. This communication could be made in response to a request by client device 14 (e.g., by an agent thereon). Upon receipt, client resolution system 22A will analyze the prerequisites and determine whether it has the needed prerequisites. Specifically, client resolution system 22A will determine whether any prerequisites are lacking (from client device 14A). In a typical embodiment, this information is determined from cache on client device 14A. To this extent, client device 14A should maintain up to date information concerning its available computer resources, packages and services. Once the analysis is complete, client resolution system 22A will generate and send a response back to server 12 that indicates the missing prerequisites. Resolution engine 16 will receive and cache the information derived from the response, and then attempt resolve the prerequisites.

In a typical embodiment, resolution engine 16 will resolve the prerequisites by first identifying one or more possible combinations of OSGi bundles (e.g., 18 and 20) that can provide the missing prerequisites. Thereafter, resolution engine 16 will select the most appropriate combination of OSGi bundles from the possible combinations based on the computer resource "needs" of client device 14A. Specifically, resolution engine 16 will process configuration 24A for client device 14A based on the amounts of computer resources of client device 14A each of the possible combinations will need/consume. The possible combination that best fits the needs of client device 14A will then be selected as the best combination.

It should be noted that the collection of one or more bundles providing the needed prerequisites may have prerequisites of their own. If it is determined, either from the cached information, or by asking client device 14A (specifically client resolution system 22A on the client device 14A) that there are more missing prerequisites that must be fulfilled, resolution engine 16 will again find combinations of bundles following the aforementioned process for selecting the most appropriate combination of bundles providing the missing prerequisites. This process continues recursively until all prerequisites have been resolved.

The final combination of OSGi bundles could include any combination of OSGi bundle 18 and other OSGi bundles 20. For example, if client device 14A is lacking a certain service needed to properly run OSGi bundle 18, resolution engine 16 will identify another OSGi bundle 20 that has the necessary service and than can operate within the computer resource limitations/needs of client device 14A. Similarly, if OSGi bundle 18 would require more RAM than client device 14A wishes to have consumed, resolution engine 16 could attempt to locate one or more other OSGi bundles 20 that could be substituted for OSGi bundle 18 and operate within the resource limitations of client device 14A. To this extent, the final combination of OSGi bundles could include OSGi bundle 18 in addition to one or more other OSGi bundles 20, or one or more other OSGi bundles 20 without OSGi bundle 18.

In a typical embodiment, the resolution process occurs recursively meaning that the resolution is continuously repeated until all prerequisites are resolved, or it is determined that the prerequisites cannot be resolved within the resource limitations of the device. Recursive resolution is especially useful since any quantity or hierarchy of prerequisites might need resolution (e.g., other OSGi bundles 20 could themselves have prerequisites). Moreover, in a typical embodiment, once server 12 asks client device 14A about a particular resource or prerequisite, server 12 will not ask about that prerequisite or resource again (e.g., due to caching on server 12). In any event, once the prerequisites are completely resolved, resolution engine 16 will load the final set of OSGi bundles on client device 14A. Typically, the loading process includes server 12 sending client device 14A an instruction(s) pertaining the order in which OSGi bundles 18 and 20 should be loaded. However, if the prerequisites cannot be completely resolved, none of OSGi bundles 18 or 20 would be loaded.

II. Detailed Example

Figure 2:
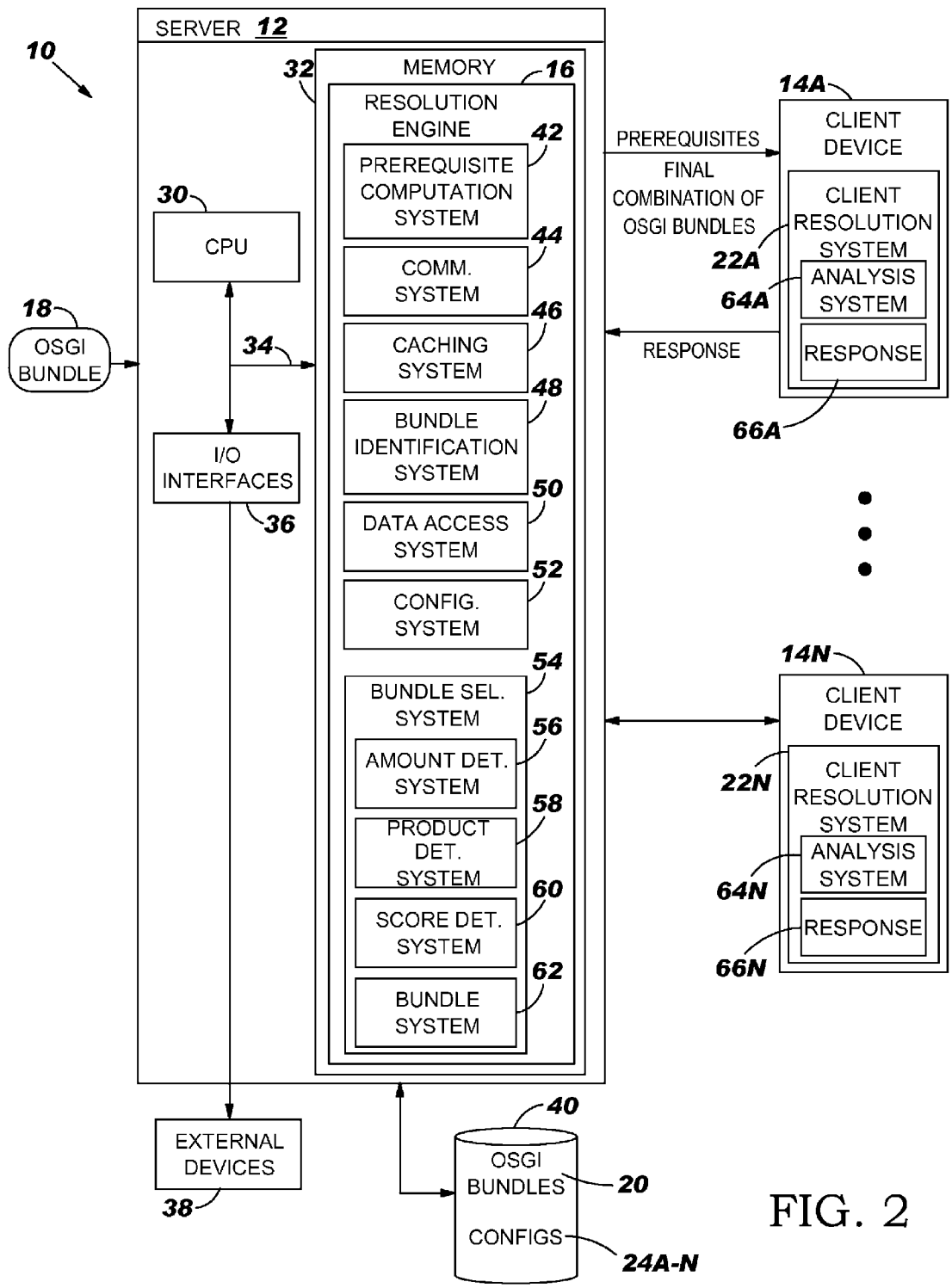
FIG. 2 depicts the system of FIG. 1 in greater detail.

Referring now to FIG. 2, a more detailed diagram of FIG. 1 is shown. As shown, server 12 generally comprises central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and computer system. Memory 32 may comprise any known type of data storage and/or transmission media, including magnetic media, optical media, random access memory (RAM), read-only memory (ROM), a data cache, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LCD screen, handheld device, keyboard, mouse, voice recognition system, speech output system, printer, monitor/display, facsimile, pager, etc. Bus 34 provides a communication link between each of the components in server 12 and likewise may comprise any known type of transmission link, including electrical, optical, wireless, etc.

Storage unit 40 can be any system (e.g., database, repository, etc.) capable of providing storage for information under the present invention. Such information could include, for example, additional OSGi bundles 20, configurations 24A-N (e.g., properties files), prerequisite information, etc. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Although not shown, additional components, such as cache memory, communication systems, system software, etc., may be incorporated into server. In addition, it should also be appreciated that although not shown, client device 14 would likely include computerized components similar to server 12.

Shown in memory 32 of server 12 is (tunable) resolution engine 16. As indicated above, resolution engine 16 can be part of, or incorporate parts of any OSGi management program now known or later developed. It should be understood that each of the systems within resolution engine 16 includes program code/logic for carrying out the functions described herein. To this extent, the systems could be realized as plugins or the like. In any event, assume in this example that it is desired to load OSGi bundle 18 on client device 14A. In this case, prerequisite computation system 42 will first determine the prerequisites (e.g., services and/or packages) needed for proper operation thereof. As indicated above, the prerequisites can be computed by accessing information in cache memory, storage unit 40 or the like. In another embodiment, prerequisite computation system 42 could include logic to analyze OSGi bundle 18 and compute the prerequisites.

Regardless, once the prerequisites are determined, prerequisite computation system 42 can check a running table of supplied services and packages, as maintained by prerequisite computation system 42 (e.g., in storage unit 40), and remove any prerequisites that are known to exist. Thereafter, communication system 44 will send a list of the needed prerequisites to client device 14A. As indicated above, this communication could be made in response to a request by client device 14 (e.g., by an agent thereon). Upon receipt, analysis system 64A within client resolution system 22A will analyze the prerequisites and determine whether all needed prerequisites are present. To this extent, client device 14A should maintain up to date information concerning its available computer resources, packages and services. After the analysis, response system 66A will generate and send a response back to server 12. The response will identify any resource limitations of client device 14A. For example, if client device 14 lacked a necessary service or package, those limitations would be noted in the response that is sent back to server 12. Similarly, if it is indicated that an amount of RAM, threads, etc., are needed to run the bundle(s), then the level of the pertinent resource is indicated to the server 12 from client device 14A.

Upon receipt, caching system 46 will cache the information derived from the response for later use in the prerequisite resolution process (and update the running table). Thereafter, bundle identification system 48 will identify possible combinations of OSGi bundles that fulfill the missing prerequisites. For example, if client device 14A lacked service "A," and package "C," bundle identification system 48 would attempt to find possible combinations of OSGi bundles (18 and 20) that will provide those prerequisites. To this extent, assume that there are three possible combinations of OSGi bundles that will provide all necessary prerequisites, namely, possible combinations "1," "2" and "3."

Once these possible combination have identified, bundle selection system 54 will select as the most appropriate combination of OSGi bundles (i.e., a final combination of OSGi bundles), by processing the configuration corresponding to client device 14A in view of the amounts of computer resources of client device 14A each possible combination will require. In particular, data access system 50 will first access the configuration 24A corresponding to client device 14A. In a typical embodiment, the properties files 24A-N are stored locally to server 12 (e.g., in storage unit 40). However, this need not be the case and the properties files can be accessed remotely. Regardless, as indicated above, each client device 14A-N will have a corresponding configuration 24A-N (i.e., each configuration may be configured for a particular device, all devices of a specific device type, or by any other grouping option). As such, the configuration 24A for client device 14A will likely be accessed from within a group of configurations. To configure (create, modify or delete) configurations 24A-N, an administrator or the like (not shown) would utilize configuration system 52. To this extent, configuration system 52 could provide a set of interface pages or the like that the administrator would use to set the configurations 24A-N. This is what allows resolution engine 16 to be tunable. Specifically, resolution engine 16 is tuned based on the particular client device 14A-N on which an OSGi bundle is being loaded.

Listed again below is configuration 24A for client device 14A, which was previously shown in Section I above:

| Computer Resource | Normalization | Importance |
|---|---|---|
| BundleStorage | 0.0001 | 0 |
| NewSpaceSize | 0.0001 | 10 |
| OldSpaceSize | 0.0001 | 0 |
| OpenFiles | 10 | 0 |
| Quota | 0.0001 | 0 |
| RAM | 0.0001 | 0 |
| Sockets | 10 | 0 |
| Threads | 10 | 5 |
| Total RAM | 0.0001 | 10 |

This file would be processed by bundle selection system 54 in view of the amounts of computer resources of client device 14A that each of the possible combinations would consume. Specifically, amount detection system 56 would first determine the amounts of each of the computer resources set forth in the configuration each combination would consume. This can be done based on information contained in storage unit 40 corresponding to each combination. For example, assume each of the possible combinations would consume the corresponding amounts of computer resources:

| Computer Resource | Combination 1 | Combination 2 | Combination 3 |
|---|---|---|---|
| BundleStorage | 3000 | 4000 | 3000 |
| NewSpaceSize | 3000 | 2000 | 4000 |
| OldSpaceSize | 4000 | 5000 | 5500 |
| OpenFiles | 5 | 4 | 5 |
| Quota | 6 | 5 | 6 |
| RAM (K) | 640 | 720 | 1000 |
| Sockets | 4 | 4 | 5 |
| Threads | 5 | 7 | 8 |
| Total RAM (K) | 640 | 720 | 1000 |

Once determined, this information would be processed using the normalization and importance factors set forth in configuration 24A. Specifically, product determination system 58 would determine products for each of the possible combinations of OSGi bundles by multiplying each of the amounts set forth above by the corresponding normalization factors and importance factors set forth in configuration 24A. This would yield the following results:

| Resource | Combination 1 | Normalization | Importance | Product |
|---|---|---|---|---|
| BundleStorage | 3000 | (0.0001) | 0 | 0 |
| NewSpaceSize | 3000 | (0.0001) | 10 | 3.0 |
| OldSpaceSize | 4000 | (0.0001) | 0 | 0 |
| OpenFiles | 5 | (10) | 0 | 0 |
| Quota | 6 | (0.0001) | 0 | 0 |
| RAM (K) | 640 | (0.0001) | 0 | 0 |
| Sockets | 4 | (10) | 0 | 0 |
| Threads | 5 | (10) | 5 | 250 |
| Total RAM (K) | 640 | (0.0001) | 10 | 0.64 |

| Resource | Combination 2 | Normalization | Importance | Product |
|---|---|---|---|---|
| BundleStorage | 4000 | (0.0001) | 0 | 0 |
| NewSpaceSize | 2000 | (0.0001) | 10 | 2.0 |
| OldSpaceSize | 5000 | (0.0001) | 0 | 0 |
| OpenFiles | 4 | (10) | 0 | 0 |
| Quota | 5 | (0.0001) | 0 | 0 |
| RAM (K) | 720 | (0.0001) | 0 | 0 |
| Sockets | 4 | (10) | 0 | 0 |
| Threads | 7 | (10) | 5 | 350 |
| Total RAM (K) | 720 | (0.0001) | 10 | 0.72 |

| Resource | Combination 3 | Normalization | Importance | Product |
|---|---|---|---|---|
| BundleStorage | 3000 | (0.0001) | 0 | 0 |
| NewSpaceSize | 4000 | (0.0001) | 10 | 4.0 |
| OldSpaceSize | 5500 | (0.0001) | 0 | 0 |
| OpenFiles | 5 | (10) | 0 | 0 |
| Quota | 6 | (0.0001) | 0 | 0 |
| RAM (K) | 1000 | (0.0001) | 0 | 0 |
| Sockets | 5 | (10) | 0 | 0 |
| Threads | 8 | (10) | 5 | 400 |
| Total RAM (K) | 1000 | (0.0001) | 10 | 1.0 |

After the products have been determined as in this illustrative example, score determination system 60 will determine a composite score for each of the possible combinations of OSGi bundles by summing the corresponding products. Thus, for the three combinations, the products would sum to yield the following composite scores:

$$0+3.0+0+0+0+0+0+250+0.64=253.64 \quad \text{Combination 1}$$

$$0+2.0+0+0+0+0+0+350+0.72=352.72 \quad \text{Combination 2}$$

$$0+4.0+0+0+0+0+0+400+1.0=405.00 \quad \text{Combination 3}$$

In general, the combination that has the lowest composite score (i.e., that which would consume the lowest amount of computer resources), is the most favorable combination (or least unfavorable) to load on client device 14A. Accordingly, based on the above analysis, bundle system 62 will select combination "1" as the most appropriate combination of OSGi bundles for loading on client device 14A. As indicated above, any of the potential combinations (e.g., 1, 2 or 3) could include OSGi bundles with or without OSGi bundle 18. Regardless, this resolution process will be implemented recursively until all prerequisites are resolved, or it is determined that the prerequisites cannot be resolved within the resource limitations of client device 14A. For example, if could be the case the most appropriate combination of OSGi bundles itself has prerequisites that must be examined.

It should be noted that if the combinations of OSGi bundles determined to be the most appropriate to load based on the configuration of resolution engine 16 has missing prerequisites that cannot be satisfied by the bundles to be loaded, the client, or additional bundles available for distribution, then the next most appropriate combination of bundles will be tried (i.e., the possible combinations of bundles need to satisfy a set of missing prerequisites needed by the bundle(s) to be distributed yet missing from client device 14A, are tried in sorted order, based on the aforementioned calculations which mathematically describe the "undesirability" of a combination of bundles). Additionally, since all information received from client device 14A is cached on server 12, the same questions need not be asked again. For example, if it is already determined that client device 14A lacks service "A," client device 14A will not be polled again with respect to service "A."

In any event, when all prerequisites are completely resolved, bundle system 62 will load the final combination of OSGi bundles on client device 14A. To this extent, bundle system 62 could include an instruction passing system (not shown) that will generate and pass an instruction to client device 14A regarding the order in which the final combination of OSGi bundles should be loaded. If, however, all prerequisites could not be resolved, none of the OSGi bundles 18 or 20 will be loaded on client device 14A.

Referring now to FIG. 3, a method flow diagram 100 according to the present invention is shown. As depicted, first step S1 is to identify OSGi bundle to be loaded on a client device. Second step S2 is to determine whether the OSGi bundle has any prerequisites. If not, the OSGi bundle will be loaded on the client device in step S8. However, if there are prerequisites identified in step S2, the client device will be polled in step S3. In step S4, information from the response by the client device will be cached at the server. In step S5, it will be determined whether any of the prerequisites are missing from the client device. If not, the OSGi bundle will be loaded on the client device in step S8. If, however, prerequisites were missing from the client device, it will be determined whether there are any combinations of OSGi bundles registered with the sever that will provide the missing prerequisites in step S6. If not, the process will end without the OSGi bundle being loaded on the client device in step S9. If however, there were combinations of OSGi bundles that could resolve the missing prerequisites, a most appropriate combination of OSGi bundles will be determined in step S7. This is typically determined from the configuration file for the client device following the mathematical computations set forth in the detailed example above. Once the most appropriate combination of OSGi bundles is determined, the process will be repeated recursively from step S2 for that combination of OSGi bundles. Once all prerequisites have been resolved, the OSGI bundle and any needed additional combination(s) of OSGi bundles will be loaded on the client device in step S8.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of resolution engine 16 shown in FIG. 2 is not intended to be limiting. That is, the functions of the present invention described herein could be represented by a different configuration of systems.

I claim:

1. A tunable prerequisite resolution engine for client devices in an Open Service Gateway Initiative (OSGi) framework, comprising:
    a processor; and
    a memory, the memory including:
        a prerequisite computation system for determining, on a server, necessary prerequisites for one or more OSGi bundle(s) to be run on a client device;
        a bundle identification system for identifying possible combinations of OSGi bundles on the server that fulfill any of the necessary prerequisites that are lacking from the client device;
        a data access system for accessing a configuration corresponding to the client device, wherein the configuration sets forth computer resource types, and corresponding normalization factors and importance factors for the client device; and
        a bundle selection system for selecting a final combination of OSGi bundles from the possible combinations of OSGi bundles by processing the configuration and computing based on amounts of the computer resources needed by each of the possible combinations of OSGi bundles, the bundle selection system further comprising:
            an amount determination system for determining amounts of the computer resources needed by each of the possible combinations of OSGi bundles;
            a product determination system for determining products for each of the possible combinations of OSGi bundles by multiplying each of the amounts by the corresponding normalization factors and importance factors set forth in the configuration;
            a score determination system for determining a composite score for each of the possible combinations of OSGi bundles by summing the corresponding products; and
            a bundle system for selecting the final combination of OSGi bundles from the possible combinations of OSGi bundles based on the composite scores.

2. The tunable prerequisite resolution engine of claim 1, further comprising a communication system for communicating the prerequisites from the server to the client device, and for receiving a response from the client device, wherein the response identifies any of the necessary prerequisites that are lacking from the client device.

3. The tunable prerequisite resolution engine of claim 1, wherein the configuration is accessed from among a group of properties files, and wherein each of the group of properties files is configured for a particular different client device.

4. The tunable prerequisite resolution engine of claim 1, wherein the computer resources types comprise at least one of: a bundle storage requirement, a new space size, an old space size, an open file quantity, a quota, a memory requirement, a socket quantity, and a thread quantity.

5. The tunable prerequisite resolution engine of claim 1, further comprising a configuration system for setting the configuration for the client device.

6. The tunable prerequisite resolution engine of claim 1, wherein the prerequisites comprise at least one of a service and/or package.

7. The tunable prerequisite resolution engine of claim 1, wherein the client device comprises:
    an analysis system for determining whether any of the necessary prerequisites are lacking from the client device; and
    a response system for generating and sending a response to the server.

8. The tunable prerequisite resolution engine of claim 1, wherein the client device communicates with the server over the Internet.

9. The tunable prerequisite resolution engine of claim 1, wherein the configuration sets forth computer resource types, and corresponding normalization factors and importance factors for a particular type of client device.

10. The tunable prerequisite resolution engine of claim 1, wherein the configuration sets forth computer resource types, and corresponding normalization factors and importance factors for a group of client devices.

11. The tunable prerequisite resolution engine of claim 1, wherein the possible combination of OSGi bundles having the lowest composite score is selected as the final combination of OSGi bundles.

12. A program product stored on a data storage medium for automatically resolving prerequisites for client devices in an Open Service Gateway Initiative (OSGi) framework, the program product comprising program code, which when executed, performs:
    determining, on a server, necessary prerequisites for an OSGi bundle to be run on a client device;
    determining possible combinations of OSGi bundles on the server that fulfill any of the necessary prerequisites that are lacking from the client device;
    accessing a configuration corresponding to the client device, wherein the configuration sets forth computer resource types and corresponding normalization factors and importance factors for the client device; and
    selecting a final combination of OSGi bundles from the possible combinations of OSGi bundles by processing the configuration based on amounts of the computer resources needed by each of the possible combinations of OSGi bundles, wherein the selecting further comprises:

determining amounts of the computer resources needed by each of the possible combinations of OSGi bundles;

determining products for each of the possible combinations of OSGi bundles by multiplying each of the amounts by the corresponding normalization factors and importance factors set forth in the configuration;

determining a composite score for each of the possible combinations of OSGi bundles by summing the corresponding products; and selecting the final combination of OSGi bundles from the possible combinations of OSGi bundles based on the composite scores.

13. The program product of claim 12, wherein the program code further performs:

communicating the prerequisites from the server to the client device; and receiving a response from the client device, wherein the response identifies any of the necessary prerequisites that are lacking from the client device.

14. The program product of claim 12, wherein the configuration is accessed from among a group of properties files, and wherein each of the group of properties files is configured for a particular different client device.

15. The program product of claim 12, wherein the computer resource types comprise at least one of: a bundle storage requirement, a new space size, an old space size, an open file quantity, a quota, a memory requirement, a socket quantity, and a thread quantity.

16. The program product of claim 12, wherein the program code further performs configuring the configuration for the client device.

17. The program product of claim 12, wherein the prerequisites comprise at least one of a service and a package.

18. The program product of claim 12, wherein the client device comprises:

program code for determining whether any of the necessary prerequisites are lacking from the client device; and program code for generating and sending a response to the server.

19. The program product of claim 12, wherein the client device communicates with the server over the Internet.

20. The program product of claim 12, wherein the configuration sets forth computer resource types, and corresponding normalization factors and importance factors for a particular type of client device.

21. The program product of claim 12, wherein the configuration sets forth computer resource types, and corresponding normalization factors and importance factors for a group of client devices.

22. The program product of claim 12, wherein the possible combination of OSGi bundles having the lowest composite score is selected as the final combination of OSGi bundles.

* * * * *